US012516558B2

(12) United States Patent
Peng

(10) Patent No.: US 12,516,558 B2
(45) Date of Patent: Jan. 6, 2026

(54) LATCH AND LOCKING STRUCTURE

(71) Applicant: Southco Manufacturing and Technology (Shenzhen) Co., Ltd., Shenzhen (CN)

(72) Inventor: Jingyao Peng, Shenzhen (CN)

(73) Assignee: Southco Manufacturing and Technology (Shenzhen) Co., Ltd., Shenzhen (CN)

( * ) Notice: Subject to any disclaimer, the term of this patent is extended or adjusted under 35 U.S.C. 154(b) by 153 days.

(21) Appl. No.: 17/988,119

(22) Filed: Nov. 16, 2022

(65) Prior Publication Data

US 2023/0160241 A1 May 25, 2023

(30) Foreign Application Priority Data

Nov. 19, 2021 (CN) ......................... 202122860585.2
Feb. 14, 2022 (CN) ......................... 202210131272.X

(51) Int. Cl.
*E05C 3/16* (2006.01)
*E05C 3/00* (2006.01)
*E05C 3/22* (2006.01)

(52) U.S. Cl.
CPC .............. *E05C 3/165* (2013.01); *E05C 3/006* (2013.01); *E05C 3/22* (2013.01)

(58) Field of Classification Search
CPC . E05C 3/165; E05C 3/006; E05C 3/22; E05C 3/24; E05C 3/12; E05C 3/042;
(Continued)

(56) References Cited

U.S. PATENT DOCUMENTS 2,138,251 A * 11/1938 Lindstrom .......... E05B 65/0042
70/DIG. 52
2,221,095 A * 11/1940 Jacobi ....................... E05C 3/24
70/DIG. 4

(Continued)

FOREIGN PATENT DOCUMENTS

CN 101146975 A 3/2008
CN 305186187 S 5/2019

(Continued)

OTHER PUBLICATIONS

Office Action with translation issued Aug. 17, 2023, by the Taiwan Patent Office in corresponding Taiwanese Patent Application No. 111142624. (20 pages).

(Continued)

*Primary Examiner* — Christine M Mills
*Assistant Examiner* — Faria F Ahmad
(74) *Attorney, Agent, or Firm* — Buchanan Ingersoll & Rooney PC

(57) ABSTRACT

A latch for releasably locking a first object to a second object is disclosed. The latch includes: a housing, fixed to the first object; a locking member, accommodated in the housing and pivotable between a locked position and an unlocked position in respect to the housing along a lateral axis, when the locking member is located in the locked position, its locking portions are capable of extending from the housing, and when the locking member is in the unlocked position, its locking portions retract into the housing; an operating member, at least partially accommodated in the housing, the operating member is capable of performing a longitudinal movement between a first position and a second position in respect to the housing, and a direction of the longitudinal movement is substantially perpendicular to the lateral axis; wherein the operating member is coupled with the locking member, such that a movement of the operating member is
(Continued)

capable of being converted into a pivoting movement of the locking member, when the operating member moves longitudinally forward from the first position to the second position, the locking member is pivoted from the locked position to the unlocked position. A locking structure is also disclosed.

14 Claims, 14 Drawing Sheets

(58) Field of Classification Search
CPC .......... E05C 3/14; E05C 19/022; E05C 17/04; Y10S 292/0907; Y10S 292/0898; Y10S 292/1043; Y10S 292/1044; Y10S 292/0894; Y10S 292/1077; E05B 85/26; E05B 65/0007; E05B 17/0025; E05B 1/0038; E05B 83/30; E05B 65/006
See application file for complete search history.

(56) References Cited

U.S. PATENT DOCUMENTS

| | | | | | |
|---|---|---|---|---|---|
| 2,266,119 | A * | 12/1941 | Jacobi | E05B 83/30 | 292/227 |
| 2,301,282 | A * | 11/1942 | Jacobi | E05B 83/30 | 292/227 |
| 2,313,711 | A * | 3/1943 | Jacobi | E05B 83/30 | 70/145 |
| 2,313,712 | A * | 3/1943 | Jacobi | E05B 83/30 | 70/451 |
| 2,454,926 | A * | 11/1948 | Jacobi | E05B 83/30 | 70/84 |
| 2,570,556 | A * | 10/1951 | Jacobi | E05B 83/30 | 70/370 |
| 2,864,641 | A * | 12/1958 | Leslie | E05B 77/12 | 292/336.3 |
| 2,872,234 | A * | 2/1959 | Brinton | E05B 65/006 | 292/55 |
| 3,576,338 | A * | 4/1971 | Horton | B60R 13/043 | 292/213 |
| 3,611,762 | A * | 10/1971 | McBurnie | E05B 63/248 | 70/120 |
| 4,538,844 | A * | 9/1985 | Watanabe | E05C 9/08 | 292/DIG. 37 |
| 4,818,000 | A * | 4/1989 | Bobrowski | E05C 1/04 | 292/147 |
| 6,048,001 | A * | 4/2000 | Miller | E05C 3/24 | 292/220 |
| 7,347,460 | B2 * | 3/2008 | Ala | E05C 3/24 | 292/216 |
| 7,775,566 | B2 * | 8/2010 | Hanjono | E05B 83/30 | 292/216 |
| 8,085,533 | B2 * | 12/2011 | Zhao | G06F 1/1679 | 361/679.55 |
| 8,505,986 | B2 * | 8/2013 | Sun | H01M 50/20 | 292/137 |
| 11,408,207 | B2 | 8/2022 | Liu | | |
| 2005/0087993 | A1 * | 4/2005 | Lin | G06F 1/1679 | 292/45 |
| 2005/0180562 | A1 * | 8/2005 | Chiang | G06F 1/1679 | 379/433.11 |
| 2010/0140962 | A1 | 6/2010 | Kim | | |
| 2011/0047765 | A1 * | 3/2011 | Sun | H01M 50/00 | 24/698.1 |
| 2018/0171680 | A1 * | 6/2018 | Hunt | E05B 81/28 | |
| 2023/0160241 | A1 | 5/2023 | Peng | | |

FOREIGN PATENT DOCUMENTS

| | | | | |
|---|---|---|---|---|
| CN | 306264582 | S | 1/2021 | |
| CN | 214463351 | U | 10/2021 | |
| CN | 217461796 | U | 9/2022 | |
| DE | 202012007145 | U1 * | 12/2013 | E05B 1/0038 |
| EP | 2821571 | A1 * | 1/2015 | E05B 1/0038 |
| EP | 2 378 039 | B1 | 8/2018 | |
| GB | 2413994 | A * | 11/2005 | E05B 77/42 |
| TW | M312583 | U | 5/2007 | |
| TW | M363495 | U | 8/2009 | |
| TW | I593867 | B | 8/2017 | |
| TW | I663316 | B | 6/2019 | |
| WO | 2014/169286 | A1 | 10/2014 | |

OTHER PUBLICATIONS

Taiwanese Notice of Allowance for Taiwanese Application No. 111304056, dated Apr. 28, 2023 with translation, 9 pages.
Office Action (First Office Action) issued May 15, 2025, by the State Intellectual Property Office of People's Republic of China in corresponding Chinese Patent Application No. 202210131272.X and an English translation of the Office Action. (15 pages).

* cited by examiner

LATCH AND LOCKING STRUCTURE

CROSS REFERENCE TO RELATED APPLICATION

This application claims priority of Chinese Patent Application No. 202122860585.2, entitled "LATCH AND LOCKING STRUCTURE", filed on Nov. 19, 2021, and Chinese Patent Application No. 202210131272.X, entitled "LATCH AND LOCKING STRUCTURE", filed on Feb. 14, 2022, the entire content of which is incorporated herein by reference.

TECHNICAL FIELD

The present application relates to a latch, and also relates to a locking structure comprising the latch.

BACKGROUND

A latch is a common locking member or fastener capable of locking and releasing one object in respect to another object.

Typically, a latch includes a movable component capable of rotating or moving to perform its locking and releasing process. Therefore, the latch must occupy a certain active space to ensure that its function can be properly performed. However, with the continuous improvement of product requirements in modern industry, the space required for a latch is smaller. In particular, in some usage environments, it is desirable for the latch to occupy as little space as possible in a certain direction. Therefore, so-called ultra-low latches are required to meet this usage requirement. On the other hand, in view of production cost and ease of installation and use, it is desirable for a latch to have as few components as possible.

SUMMARY

In this regard, the application provides a latch, which can at least partially solve the above problems.

The latch according to the application can be used to releasably lock a first object to a second object. The latch includes: a housing, fixed to the first object; a locking member, accommodated in the housing and pivotable between a locked position and an unlocked position in respect to the housing along a lateral axis, when the locking member is located in the locked position, locking portions of the locking member are capable of extending from the housing, and when the locking member is in the unlocked position, the locking portions of the locking member retract into the housing; an operating member, at least partially accommodated in the housing, the operating member is capable of performing a longitudinal movement between a first position and a second position in respect to the housing, and a direction of the longitudinal movement is substantially perpendicular to the lateral axis; wherein the operating member is coupled with the locking member, such that a movement of the operating member is capable of being converted into a pivoting movement of the locking member, when the operating member moves longitudinally forward from the first position to the second position, the locking member is pivoted from the locked position to the unlocked position.

In an embodiment, the housing has a first housing and a second housing, the first housing and the second housing are buckled to each other to form a non-closed accommodating space for accommodating the locking member and the operating member. The first housing is fixed to the first object), the second housing faces an outside or the second object, an opening is disposed on the second housing, and the locking member and the operating member are capable of being exposed from the opening.

In an embodiment, the locking member includes: a locking member body; a pivoting shaft, arranged at one end of the locking member body and extends in a lateral direction along both lateral sides of the locking member body, and the locking member is pivotably mounted on the first housing through the pivoting shaft, wherein the locking portions are arranged at the other end of the locking member body longitudinally opposite to the pivoting shaft; and first recessed portions, located between the pivoting shaft and the locking portions, concavely formed along a thickness direction of the locking member body, and the thickness direction is perpendicular to the lateral direction and a longitudinal direction.

In an embodiment, the locking member further includes second recessed portions located between the locking portions and the first recessed portions and concavely formed along the thickness direction; and wherein the first recessed portions are further concavely formed from ends of the second recessed portions away from the locking portions.

In an embodiment, the locking member includes two cantilevers extending forward from both lateral sides of the locking member body respectively away from the pivoting shaft, and an opened slot is formed between the two cantilevers; and the first recessed portions and the second recessed portions are respectively formed on each of the cantilevers, wherein each of the first recessed portions and the second recessed portions is in an obtuse-angled concave configuration viewed along the lateral direction, such that an end of each of the cantilevers is in an acute-angled convex configuration, and the two cantilevers are left-right symmetrical in respect to a longitudinal centerline of the locking member.

In an embodiment, the operating member includes an operating member body and abutting portions, the abutting portions are located at a longitudinal rear end of the operating member body and extend laterally from both lateral sides of the operating member body; and when the operating member is in the first position, the abutting portions are fit into the first recessed portions, and when the operating member is in the second position, the abutting portions are fit into the second recessed portions, such that the operating member is mounted on the locking member via the abutting portions, and a longitudinal front end of the operating member extends forward along the longitudinal direction.

In an embodiment, the operating member body is accommodated in the opened slot, such that portions of the operating member other than the abutting portions are not overlapped with the locking member in the thickness direction.

In an embodiment, a portion of the operating member extending forward along the longitudinal direction forms a pull ring for a user to perform a pulling operation; the housing is provided with a housing ring, and the housing ring is located at a longitudinal front end of the accommodating space for the user to hold; and the pull ring is arranged in a space surrounded by the housing ring, when the operating member is in its first position, the pull ring is away from an inner side of the housing ring, and when the operating member is in its second position, the pull ring is close to the inner side of the housing ring.

In an embodiment, a sliding slot extending along the longitudinal direction is arranged at a lateral center position of the operating member body of the operating member, and a positioning protrusion inserted into one end of the sliding slot is arranged on an inner side of the housing; and the latch further includes a first elastic member for biasing the operating member to the first position, the first elastic member is arranged in the sliding slot of the operating member, and both ends of the first elastic member respectively abut against the positioning protrusion and the other end of sliding slot.

In an embodiment, the housing has a substantially flat rectangular shape, the first housing, the second housing, the locking member and the operating member body are all substantially in a shape of a plate, and a thickness of the entire latch does not exceed a thickness of the locking member; notches corresponding to the cantilevers of the locking member are arranged on the first housing to provide a pivoting space for the locking member; the locking member body of the locking member is provided with engaging concave portions on both lateral sides respectively, the engaging concave portions are disposed between the pivoting shaft and the first recessed portions along the longitudinal direction, and inner sides of the opening of the second housing are correspondingly provided with engaging convex portions for cooperating with the engaging concave portions, so as to restrict a pivoting degree of the locking member extending from the housing; and the positioning protrusion is formed on a longitudinal front side of the opening of the second housing.

In an embodiment, a second elastic member is disposed between the housing and the locking member, and the second elastic member biases the locking member to its locked position.

In an embodiment, the abutting portions are closer to the second housing in the thickness direction than a rotation center of the pivoting shaft, and when the locking member is in its locking position, the abutting portions abut against a rear end of the first recessed portions to prevent the locking member from being pivoted toward its unlocked position.

In an embodiment, the second recessed portions are arranged such that when the locking member is in its locked position, front surfaces of the second recessed portions do not protrude beyond the housing.

The locking structure according to the application includes: a first object, capable of being inserted into a second object along a longitudinal direction; and the latch according to the application, fixed on a side of the first object facing the second object, and the second object is provided with a corresponding locking hole for the locking portions to extend into.

BRIEF DESCRIPTION OF THE DRAWINGS

Embodiments of the present application will be specifically described below in conjunction with the accompanying drawings, in which.

DETAILED DESCRIPTION

Although the disclosure is illustrated and described herein with reference to specific embodiments, the disclosure should not be limited to the shown details. Specifically, various modifications may be made in these details within the scope of equivalents of the claims and without departing from the disclosure.

The direction descriptions such as “front,” “rear,” “up,” and “down” involved in this document are only for the convenience of understanding, and the disclosure is not limited to these directions, but can be adjusted according to actual situation.

Figure 1E:
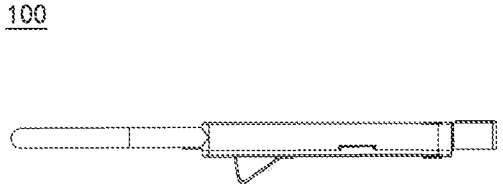
FIGS. 1A to 1F are respectively a front view, a rear view, a left view, a right view, a top view, and a bottom view of a latch according to the application.
Figure 1C:
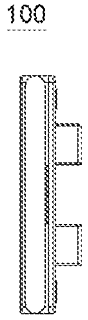
Figure 1A:
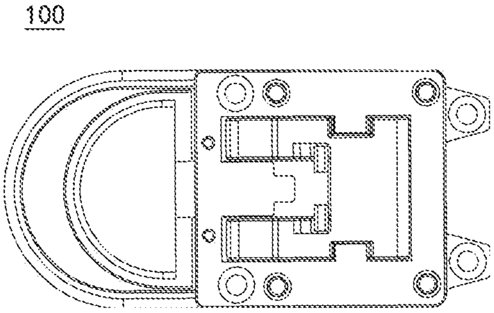
Figure 1D:
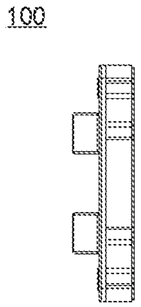
Figure 1F:
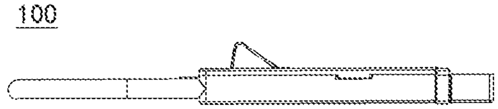
Figure 1B:
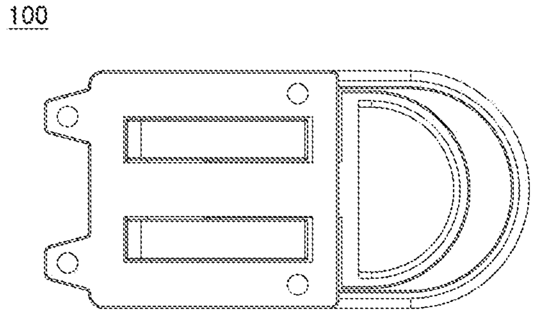
Figure 1G:
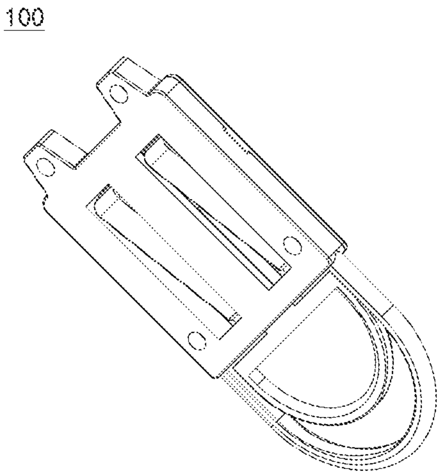
FIGS. 1G to 1J are perspective views of the latch at different angles.
Figure 1H:
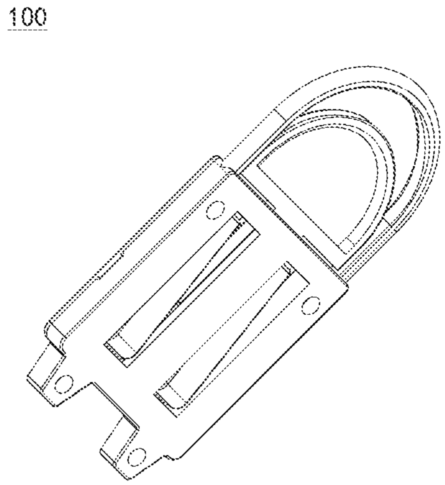
Figure 1I:
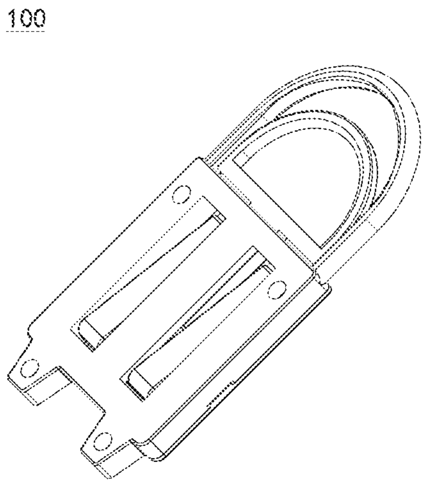
Figure 1J:
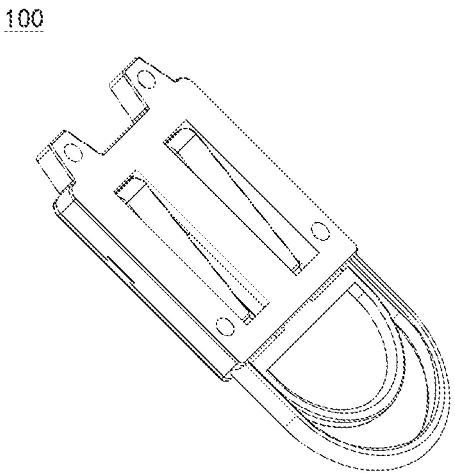
Figure 2:
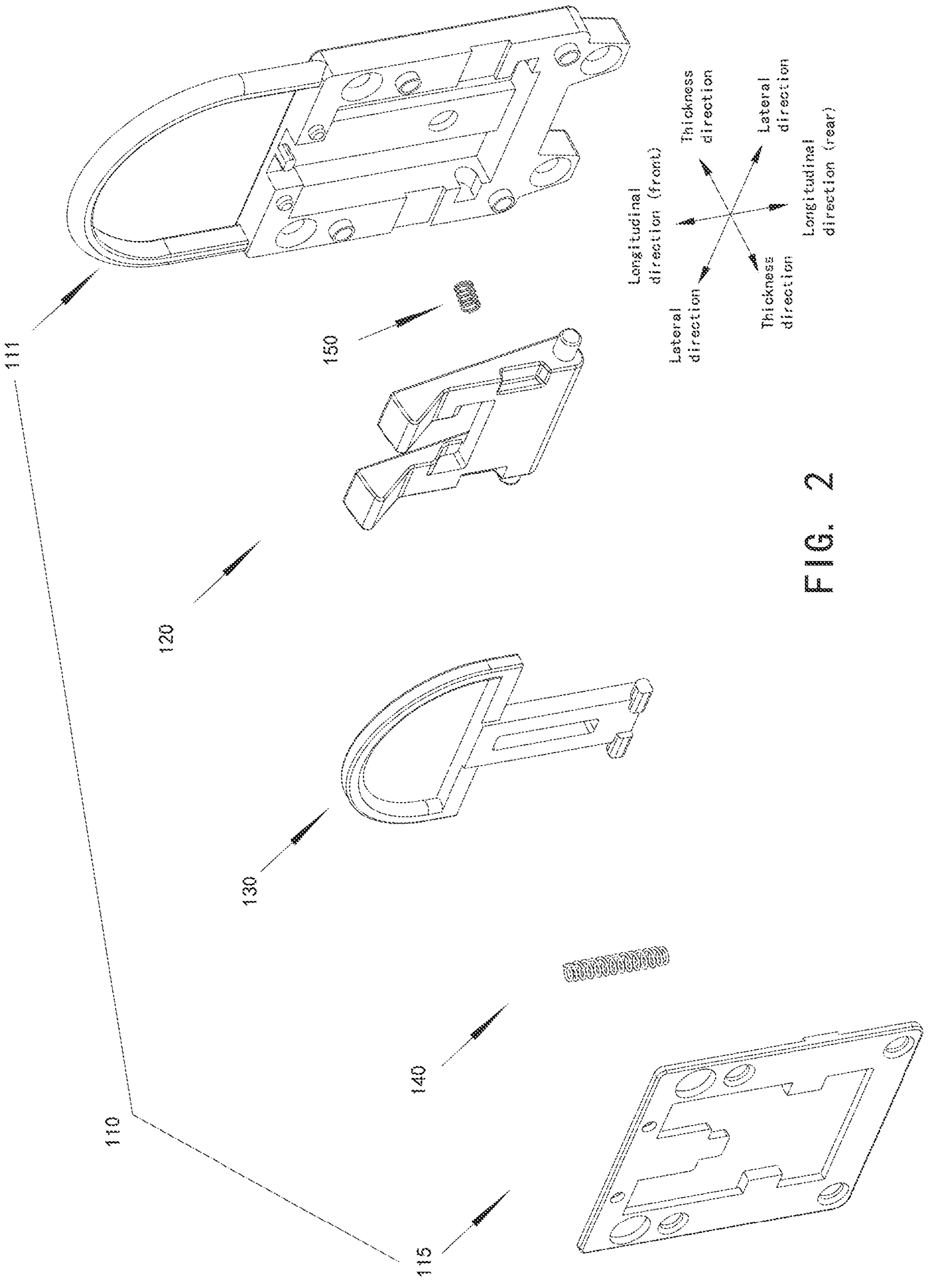
FIG. 2 is an exploded perspective view of the latch.

Now the latch 100 according to the application will be generally described by referring to FIGS. 1A to 2.

As shown, the latch 100 includes a housing 110, a locking member 120, an operating member 130, a first elastic member 140, and a second elastic member 150. Among them, the housing 110 is used for accommodating other components of the latch 100 and fixing the latch 100 to a first object 200 such as a server or a hard disk. In the application, the housing 110 is formed by a first housing 111 and a second housing 115 buckled to each other. It should be understood, in other embodiments, the housing 110 may also be an integral component. The locking member 120 is pivotally accommodated in the housing 110 for locking the latch 100 to a second object 300, such as a cabinet. The operating member 130 is linear movably accommodated in the housing 110 for the user to operate. The operating member 130 is coupled with the locking member 120, such that a movement of the operating member 130 can be converted into a pivoting movement of the locking member 120. The first elastic member 140 is used to bias the operating member 130 to the locked position, and the second elastic member 150 is used to bias the locking member 120 to the locked position (to be described in detail hereinbelow).

In the following, for the convenience of description, the extending direction of a pivoting shaft 121 of the locking member 120 is referred to as a lateral direction, the moving direction of the operating member 130 is referred to as a longitudinal direction, and the direction perpendicular to the longitudinal direction and the lateral direction is referred to as the thickness direction. Moreover, the direction of the operating member 130 corresponding to the locked position is referred to as the rear, and the direction corresponding to the unlocked position is referred to as the front. In this embodiment, the longitudinal direction, the lateral direction, and the thickness directions are substantially perpendicular to each other. It should be understood, in other embodiments, according to the use environment, especially according to the shapes of the first object 200 and the second object 300, the longitudinal direction, the lateral direction, and the thickness direction may be arranged to have a certain angle with each other.

Figure 3A:
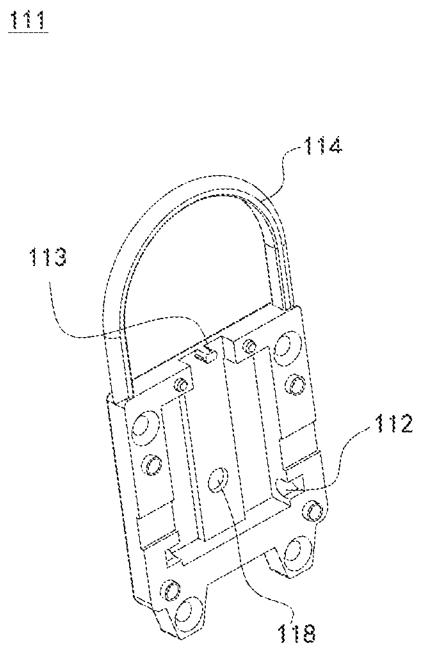
FIGS. 3A and 3B are perspective views of a first housing of the latch at different angles.
Figure 3B:
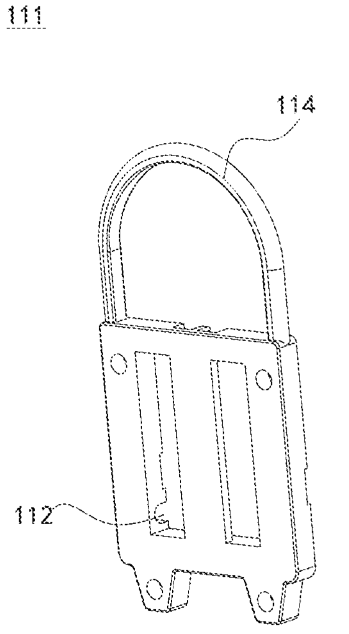

Now a specific structure of the first housing 111 will be described by referring to FIGS. 3 A to 3B.

The first housing 111 is a portion of the housing 110 facing the first object 200, and having a substantially flat rectangular shape. The first housing 111 includes: a pivoting shaft slot 112, a positioning protrusion 113, a housing ring 114, and a first blind hole 118. Among them, the pivoting shaft slot 112 is arranged near a rear end of the first housing 111 and extends in the lateral direction. The pivoting shaft slot is formed by being recessed outward from an inner surface of the first housing 111 for accommodating the pivoting shaft 121 of the locking member 120. The housing ring 114 is formed at a front end of the first housing 111 in a shape of a substantially semicircular, and a diameter of the semicircular extends in the lateral direction. The positioning protrusion 113 is located approximately at a center of the housing ring 114 and rises inwardly in the thickness direction from an inner surface of the first housing 111 for positioning the operating member 130 and the first elastic member 140. The first blind hole 118 is located in a middle of the first housing 111 in the lateral direction, slightly forward in the longitudinal direction compared to the position of the pivoting shaft slot 112, and is formed by being recessed from an inner side of the first housing 111. The first blind hole 118 is used to accommodate and abut against the second elastic member 150.

The first housing 111 is also provided with notches corresponding to cantilevers of the locking member 120 to provide a pivoting space for the locking member 120.

Figure 4A:
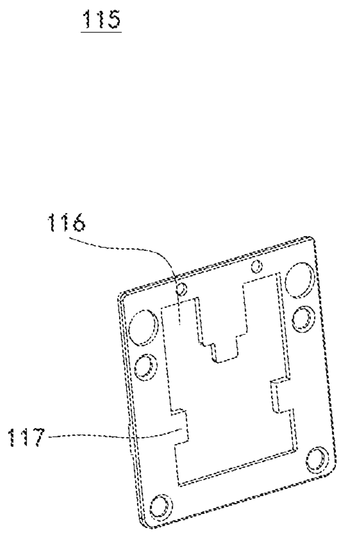
FIGS. 4A and 4B are perspective views of a second housing of the latch at different angles.
Figure 4B:
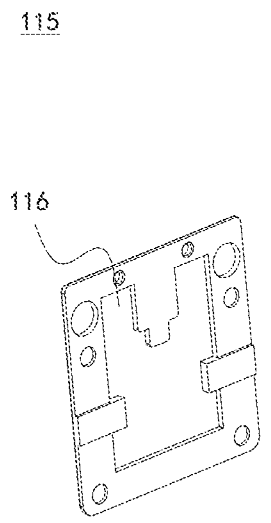

Now a specific structure of the second housing 115 will be described by referring to FIGS. 4A to 4B.

The second housing 115 is a portion of the housing 110 facing outward (when not locked to the second object 300) or the second object 300 (when locked to the second object 300), and also has a generally flat rectangular shape. An opening 116 is arranged on the second housing 115, and the locking member 120 and the operating member 130 can be exposed from the opening 116. Inner sides of the opening 116 of the second housing 115 are correspondingly provided with engaging convex portions 117 to cooperate with engaging concave portions 126 of the locking member 120, thereby restricting a pivoting degree of the locking member 120 extending from the housing 110. The positioning protrusion 113 of the first housing 111 is corresponding to a front end position of the opening 116 of the second housing 115.

Figure 5A:
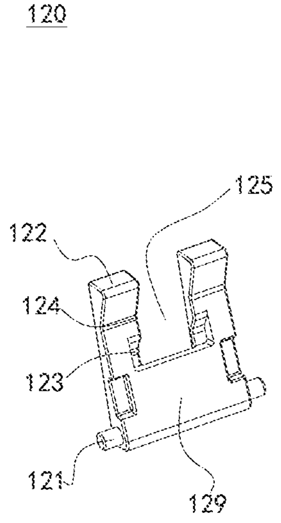
FIGS. 5A and 5B are perspective views of a locking member of the latch at different angles.
Figure 5B:
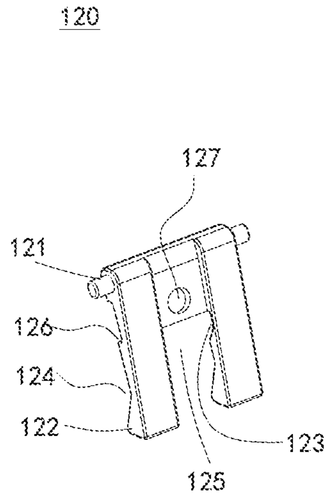

Now a specific structure of the locking member 120 according to the application will be described by referring to FIGS. 5A to 5B.

As shown, the locking member 120 includes: a locking member body 129, a pivoting shaft 121, locking portions 122, first recessed portions 123, second recessed portions 124, an opened slot 125, engaging concave portions 126, and a second blind hole 127. The pivoting shaft 121 and the locking portions 122 are arranged at opposite ends of the locking member 120 along the longitudinal direction. More specifically, the pivoting shaft 121 is arranged at a rear end of a locking member body 129, and extends in the lateral direction along lateral sides of the locking member body 129 in the lateral direction. The locking member 120 is pivotably mounted on the first housing 111 through the pivoting shaft 121. The locking portions 122 are arranged at the front end of the locking member 120 and rise from the locking member 120 toward the second housing 115 in the thickness direction. When the locking member 120 is in the locked position, the locking portions 122 extend from the opening 116 of the second housing 115, so as to be engaged and locked to the second object 300.

The locking member 120 includes two cantilevers respectively extending forward from both lateral sides of the locking member body 129, and an opened slot 125 is formed between the two cantilevers. The operating member body 131 has a shape corresponding to the opened slot 125 and is accommodated in the opened slot 125, such that portions of the operating member 130 other than abutting portions 132 are not overlapped with the locking member 120 in the thickness direction.

Figure 7A:
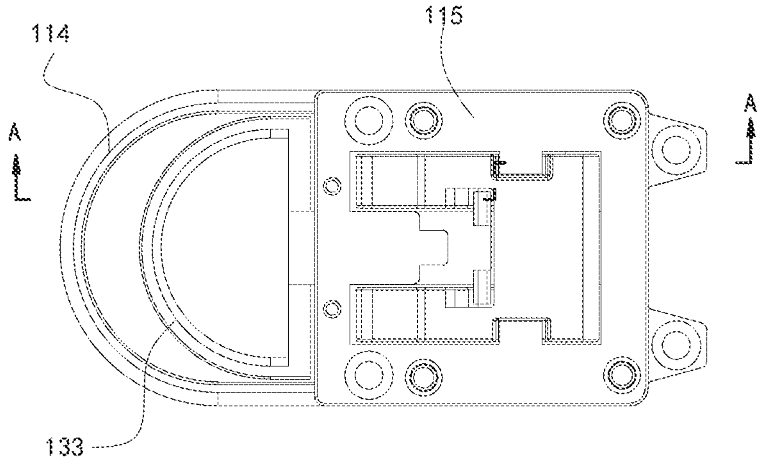
FIG. 7A is a front view of the latch in a locked state.
Figure 7B:
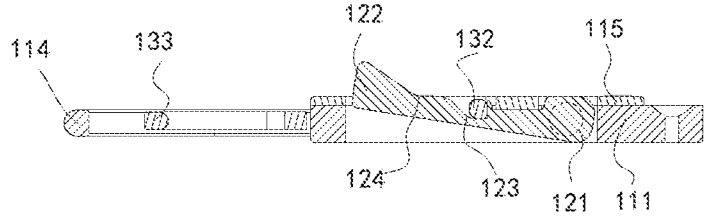
FIG. 7B is a sectional view taken along line A-A in FIG. 7A, FIGS. 7C to 7E are perspective views corresponding to different angles in FIG. 7A, where in FIG. 7E the second housing has been removed to show an interior of the latch.
Figure 7C:
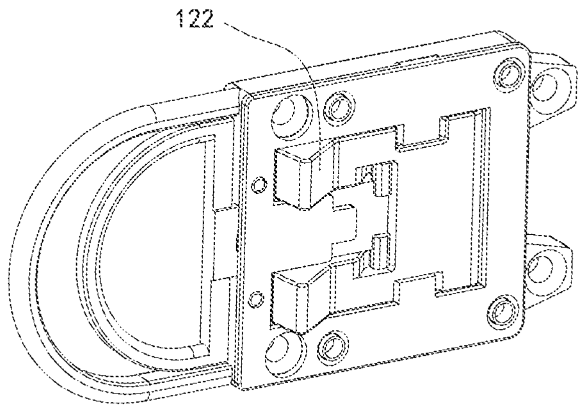
Figure 7D:
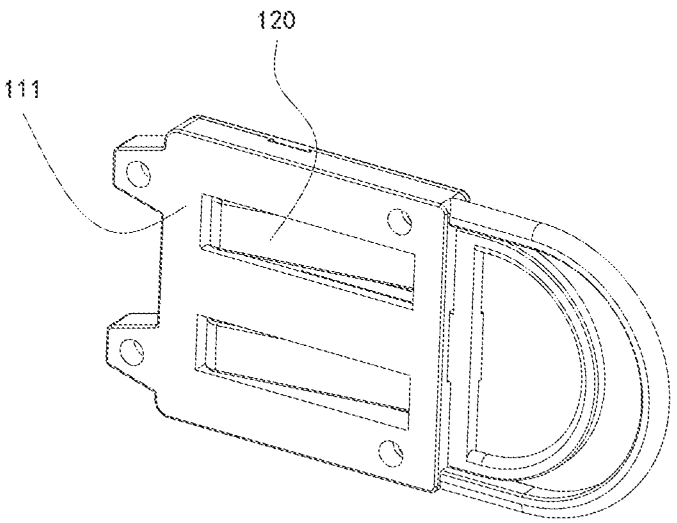
Figure 7E:
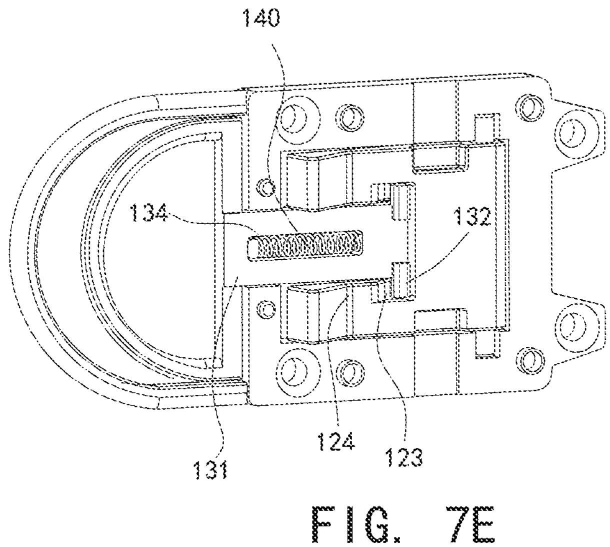
Figure 8A:
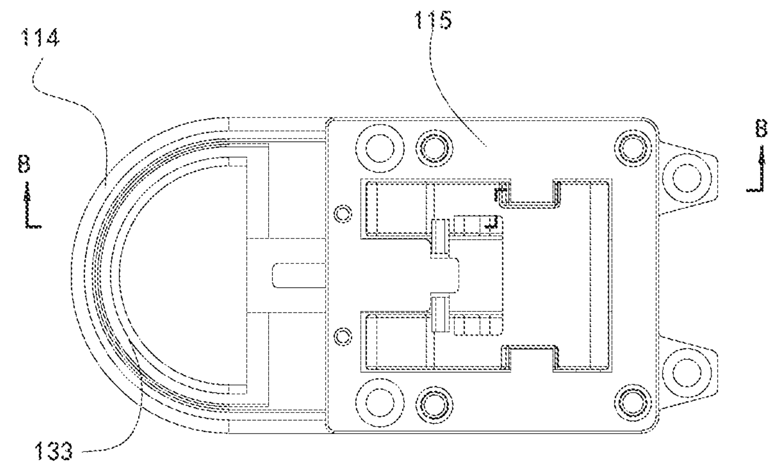
FIG. 8A is a front view of the latch in an unlocked state.
Figure 8B:
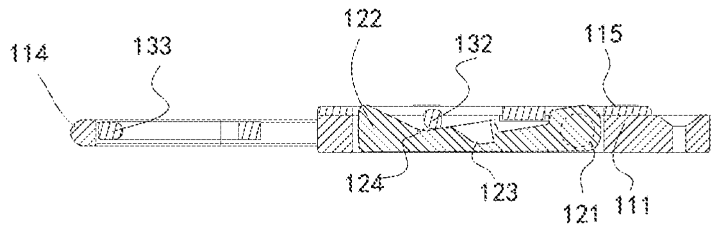
FIG. 8B is a sectional view taken along line B-B in FIG. 8A, and FIGS. 8C to 8E are perspective views corresponding to different angles in FIG. 8A, where in FIG. 8E the second housing has been removed to show the interior of the latch.
Figure 8C:
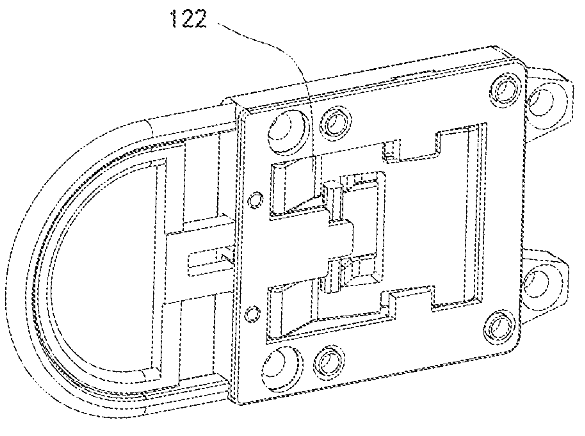
Figure 8D:
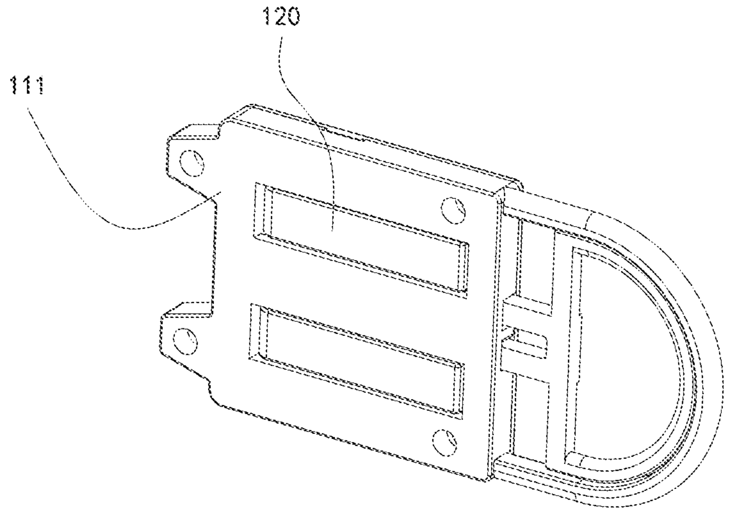
Figure 8E:
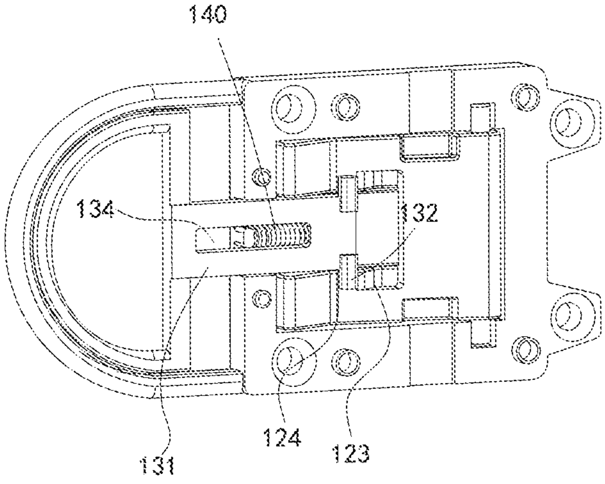

A first recessed portion 123 and a second recessed portion 124 are respectively formed on each of the cantilevers. The two cantilevers are symmetrical in respect to a longitudinal centerline of the locking member 120. The first recessed portions 123 are located between the pivoting shaft 121 and the locking portions 122, and are concavely formed along the thickness direction of the locking member body 129. The second recessed portions 124 are located between the locking portions 122 and the first recessed portions 123, and are also concavely formed along the thickness direction. More specifically, the first recessed portions 123 are further concavely formed from ends of the second recessed portions 124 away from the locking portions 122, that is, when viewed from a lateral perspective (FIG. 8B), the first recessed portions 123 are sunken more than the second recessed portions 124, or closer to the first housing 111. Each of the first recessed portions 123 and the second recessed portions 124 is in an obtuse-angled concave configuration, such that an end of each of the cantilevers is in an acute-angled convex configuration, and the two cantilevers are left-right symmetrical in respect to the longitudinal centerline of the locking member 120. As shown in FIG. 7B, in the locked state, the side of each of the second recessed portions 124 away from the locking portions 122 (right side in FIG. 7B) does not protrude beyond an outer surface of the second housing 115. In this way, in the locked state, only the locking portions 122 extends to an outside of the second housing 115, thereby allowing the second housing 115 to be arranged close to the second object 300 and reducing a space occupied by the latch 100.

The engaging concave portions 126 are arranged on both lateral sides of the locking member body 129 of the locking member 120, and are disposed between the pivoting shaft 121 and the first recessed portions 123 along the longitudinal direction. The engaging concave portions 126 abut against the engaging convex portions 117 of the second housing 115 to limit a pivoting range of the locking member 120, such that the locking member 120 is not separated from the housing 110 from the side of the second housing 115.

The second blind hole 127 is located at a center of the locking member body 129 in the lateral direction, slightly ahead of the pivoting shaft 121 in the longitudinal direction, and is formed by being recessed from a side of the locking member body 129 facing the first housing 111. The second blind hole 127 is corresponding to the position of the first blind hole 118. Both ends of the second elastic member 150 are respectively accommodated and abutted in the first blind hole 118 and the second blind hole 127, thereby biasing the locking member 120 to the locked position.

In other embodiments, the second elastic member 150, the first blind hole 118, and the second blind hole 127 may not be provided. Alternatively, a torsion spring may be disposed between the pivoting shaft 121 of the locking member 120 and the pivoting shaft slot 112 of the first housing 111, and the torsion spring biases the locking member 120 to a position protruding from the second housing 115 (i.e., the locked position).

Figure 6A:
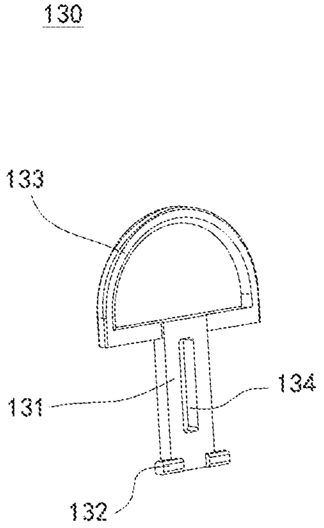
FIGS. 6A and 6B are perspective views of an operating member of the latch at different angles.
Figure 6B:
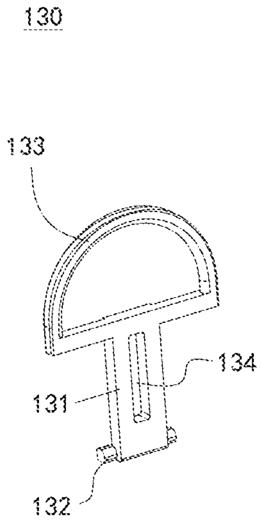

Now a specific structure of the operating member 130 will be described by referring to FIGS. 6A to 6B.

As shown, the operating member 130 includes an operating member body 131, abutting portions 132, a pull ring 133, and a sliding slot 134. Among them, the abutting portions 132 are located at a longitudinal rear end of the operating member body 131, and extend from both lateral sides of the operating member body 131 along the lateral direction. In addition, the abutting portions 132 are slightly raised from the operating member body 131 toward the second housing 115 in the thickness direction, so as to be fit into the first recessed portions 123 and the second recessed portions 124 of the locking member 120. When the operating member 130 is in the locking position, the abutting portions 132 are fit into the first recessed portions 123, and when the operating member 130 is in the unlocked position, the abutting portions 132 are fit into the second recessed portions 124, such that the operating member 130 is mounted on the locking member 120 via the abutting portions 132. The longitudinal front end of the operating member 130 extends forward along the longitudinal direction.

The pull ring 133 is arranged at the front end of the operating member 130, and is exposed outside the accommodating space formed by the first housing 111 and the second housing 115, so as to facilitate operating of the user. The pull ring 133 is approximately semi-circular, and its diameter is slightly smaller than that of the housing ring 114. When the operating member 130 is in the unlocked position, the pull ring 133 abuts against the inner side of the housing ring 114. The sliding slot 134 is arranged at the lateral center position of the operating member body 131, and extends along the longitudinal direction. The position of the sliding slot 134 is corresponding to the position of the positioning protrusion 113 of the housing 110, such that the positioning protrusion 113 is inserted into the sliding slot 134 to limit a longitudinal movement range of the operating member 130. In other embodiments, the pull ring 133 may also be rectangular, trapezoidal or any other shape.

The first elastic member 140 is arranged in the sliding slot 134, and its two ends respectively abut the positioning protrusion 113 and an end of the sliding slot 134, so as to bias the operating member 130 to the locked position (i.e., the rear end). In this embodiment, the first elastic member 140 is a compression spring.

Now the operation of the latch 100 according to the application will be described by referring to FIGS. 7A to 8E.

In FIGS. 7A to 7E, the latch 100 is in the locked position. At this time, the operating member 130 is close to the rear end of the latch 100, and the abutting portions 132 of the operating member 130 are fit into the first recessed portions 123 of the locking member 120. Since the first recessed portions 123 is more deeply recessed, the locking member 120 is pivoted to the locked position under biasing of the torsion spring, i.e., the position where the locking portions 122 extends from the second housing 115. At this time, the locking portions 122 can be fit to a corresponding part of the second object 300, thereby locking the latch 100 (and the first object 200 fixed to the latch 100) to the second object 300.

In the shown embodiment, the abutting portions 132 are closer to the second housing 115 than the rotation center of the pivoting shaft 121 in the thickness direction, i.e., higher in FIG. 7B. When the latch 100 is shaken by an accidental impact, the locking member 120 tends to rotate toward the unlocked position, that is, tends to rotate counterclockwise in FIG. 7B. At this time, since the abutting portions 132 abuts against the rear end of the first recessed portions 123 and the position of the abutting portions 132 is closer to the second housing 115 than the pivoting shaft 121, the abutting portions 132 will block the trend of the locking member 120 to rotate counterclockwise. Therefore, such an arrangement is advantageous in preventing accidental unlocking of the latch 100. It should be understood, in other embodiments, the abutting portions 132 may be equidistant from, or more distant from, the second housing 115 than the rotation center of the pivoting shaft 121 in the thickness direction.

When the user needs to unlock the first object 200, the user may grasp the pull ring 133 of the operating member 130, and pull the pull ring 133 toward the housing ring 114. In this way, the operating member 130 moves forward in respect to the first housing 111, the second housing 115, and the locking member 120, such that the abutting portions 132 move from the first recessed portions 123 to the second recessed portions 124. Since the second recessed portions 124 are shallow, the locking member 120 is forced to be pivoted toward the direction of the first housing 111, such that the latch 100 reaches the unlocked position shown in FIGS. 8A to 8E. At this time, the abutting portions 132 are engaged in the second recessed portions 124, such that the locking member 120 does not automatically return to the locked position. At this time, the locking portions 122 is retracted into the housing 110 and no longer fit to the second object 300, thereby releasing the latch 100 (and the first object 200 fixed to the latch 100) from the second object 300.

Figure 9:
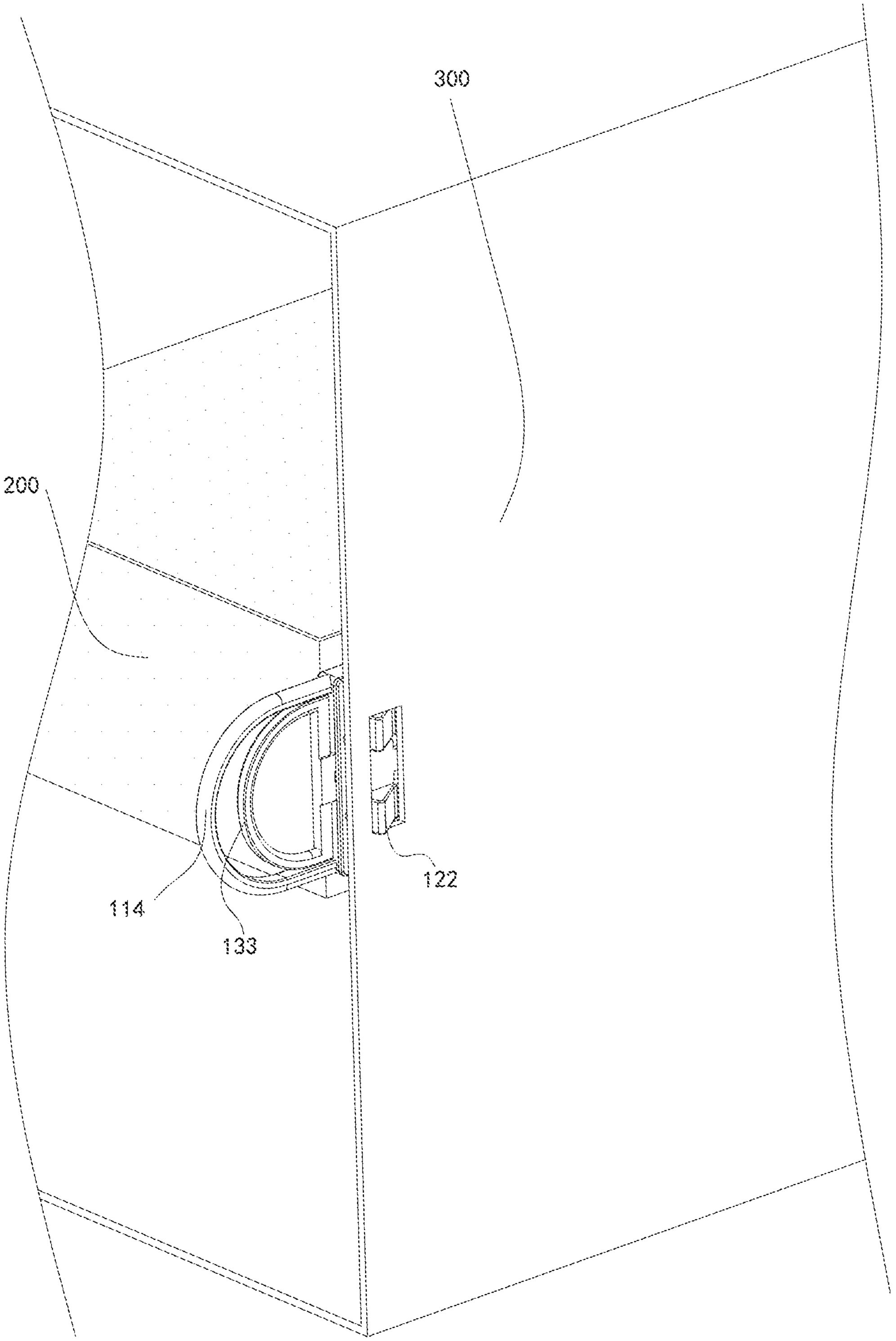
FIG. 9 is a perspective view of an exemplary application scenario of the latch applied to a first object and a second object, where the latch is in a locked state.
Figure 10:
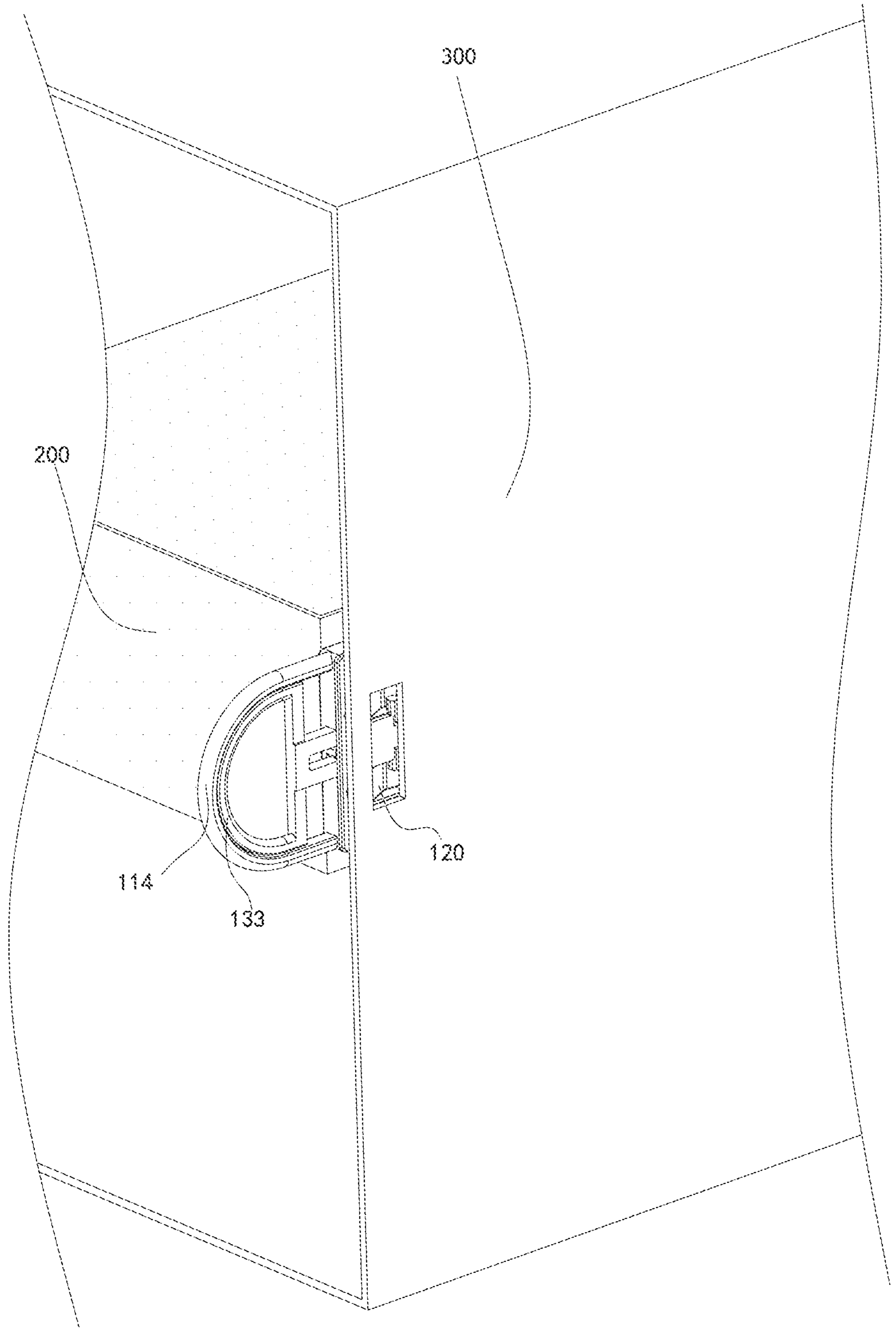
FIG. 10 is a perspective view of an exemplary application scenario of the latch applied to a first object and a second object, where the latch is in an unlocked state.

Now an example of applying the latch 100 to the first object 200 and the second object 300 will be described by referring to FIGS. 9 to 10. As shown, the latch 100 is mounted on the side of the first object 200 facing the first object 200. When the first object 200 is inserted into the second object 300, rearward-facing slopes of the locking portions 122 abut on the second object 300, such that the locking portions 122 are temporarily pivoted to the unlocked position. When the first object 200 is completely inserted into the second object 300, the locking portions 122 automatically pops up and is fit into a window of the second object 300, so as to lock the first object 200. The user can pull the pull ring 133 to unlock the first object 200, and can also pull the first object 200 out of the second object 300 through the pull ring 133. Furthermore, since the latch 100 is designed laterally symmetrical, it can be applied to both sides of the first object 200 symmetrically.

Figure 11A:
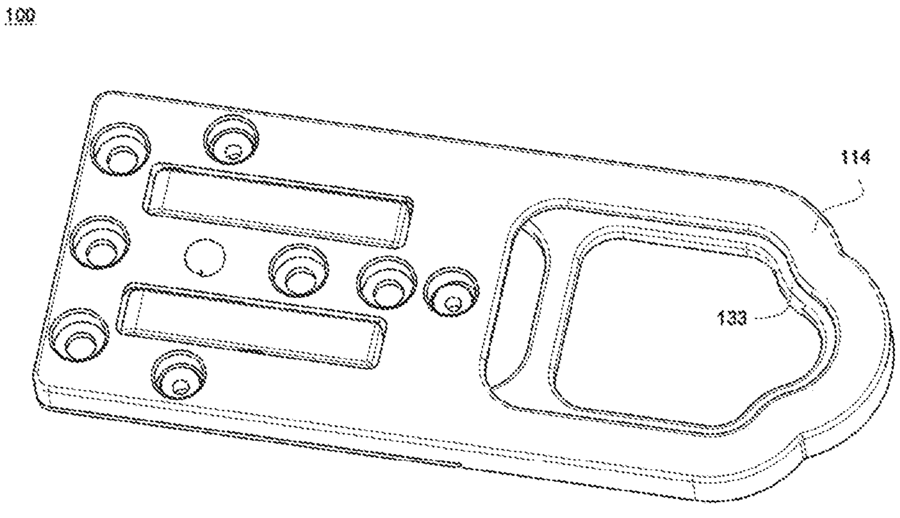
FIGS. 11A and 11B are perspective views of different angles of another embodiment of the latch, in which the housing ring and the pull ring have varied shapes.
Figure 11B:
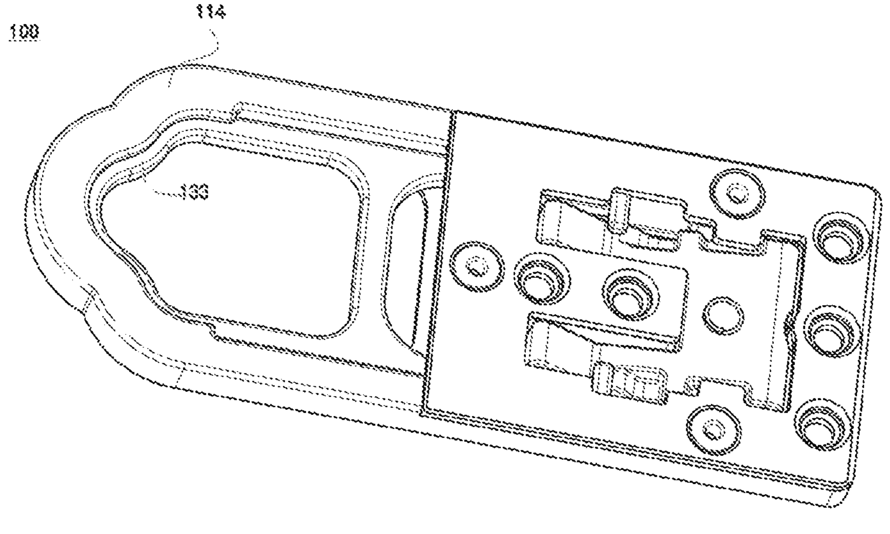

FIGS. 11A and 11B are perspective views of different angles of another embodiment of the latch 100, in which the housing ring 114 and the pull ring 133 have varied shapes. More specifically, the housing ring 114 is connected by a plurality of curve sections, including a curve section located on each sides of the transverse direction and close to the rear (left side of FIG. 11A) and a curve section located in the middle of the transverse direction and protruding toward the front (right side of FIG. 11A). The pull ring 133 has a shape corresponding to the housing ring 114. The above shape of the housing ring 114 and the pull ring 133 is favorable for improving the beauty and operation convenience of the latch 100.

In summary, the application provides a latch 100 with a simple structure and convenient operation. Moreover, through a special design of the housing 110, the operating member 130, and the locking member 120, the necessary functions of the latch 100 can be achieved while overlapping of the components in the thickness direction is minimized, thereby realizing an ultra-thin design.

Although preferred embodiments have been shown and described herein, it should be understood, these embodiments are given by way of example only. Those skilled in the art will think of many variants, changes and substitutions without departing from the spirit of the disclosure. Therefore, the appended claims are intended to cover all such variants as fall within the spirit and scope of this invention.

LIST OF REFERENCE SIGNS

- 100 latch
  - 110 housing
    - 111 first housing
      - 112 pivoting shaft slot
      - 113 positioning protrusion
      - 114 housing ring
      - 118 first blind hole
    - 115 second housing
      - 116 opening
      - 117 engaging convex portion
  - 120 locking member
    - 121 pivoting shaft
    - 122 locking portion
    - 123 first recessed portion
    - 124 second recessed portion
    - 125 opened slot
    - 126 engaging concave portion
    - 127 second blind hole
    - 129 locking member body
  - 130 operating member
    - 131 operating member body
    - 132 abutting portion
    - 133 pull ring
    - 134 sliding slot
  - 140 first elastic member
  - 150 second elastic member
- 200 first object
- 300 second object

What is claimed is:

1. A latch (100) for releasably locking a first object (200) to a second object (300), wherein the latch (100) comprises:

a housing (110), fixed to the first object (200);

a locking member (120), accommodated in the housing (110) and pivotable between a locked position and an unlocked position in respect to the housing (110) along a lateral axis, when the locking member (120) is located in the locked position, locking portions (122) of the locking member (120) are capable of extending from the housing (110), and when the locking member (120) is in the unlocked position, the locking portions (122) of the locking member (120) retract into the housing (110);

an operating member (130), at least partially accommodated in the housing (110), the operating member (130) is capable of performing a longitudinal movement between a first position and a second position in respect to the housing (110), and a direction of the longitudinal movement is substantially perpendicular to the lateral axis;

wherein the operating member (130) is coupled with the locking member (120), such that a movement of the operating member (130) is capable of being converted into a pivoting movement of the locking member (120), when the operating member (130) moves longitudinally forward from the first position to the second position, the locking member (120) is pivoted from the locked position to the unlocked position;

wherein the locking member (120) includes a pivoting shaft (121) and wherein the pivoting shaft (121) and the locking portions (122) are arranged at opposite ends of the locking member (120) along a longitudinal direction parallel to the longitudinal movement of the operating member (130); and wherein the locking member (120) includes first recessed portions (123) located between the pivoting shaft (121) and the locking portions (122), concavely formed along a thickness direction of the locking member body (129), and the thickness direction is perpendicular to a lateral direction and a longitudinal direction of the locking member (120).

2. The latch (100) according to claim 1, wherein:

the housing (110) includes:

a first housing (111) and a second housing (115), the first housing (111) and the second housing (115) are buckled to each other to form a non-closed accommodating space for accommodating the locking member (120) and the operating member (130);

wherein the first housing (111) is fixed to the first object (200), the second housing (115) faces an outside or the second object (300), an opening (116) is disposed on the second housing (115), and the locking member (120) and the operating member (130) are capable of being exposed from the opening (116).

3. The latch (100) according to claim 2, wherein:

the locking member (120) includes:

a locking member body (129);

the pivoting shaft (121) is arranged at one end of the locking member body (129) and extends in the lateral direction along both lateral sides of the locking member body (129), and the locking member (120) is pivotably mounted on the first housing (111) through the pivoting shaft (121).

4. The latch (100) according to claim 3, wherein:

the locking member (120) further includes second recessed portions (124) located between the locking portions (122) and the first recessed portions (123) and concavely formed along the thickness direction; and wherein the first recessed portions (123) are further concavely formed from ends of the second recessed portions (124) away from the locking portions (122).

5. The latch (100) according to claim 4, wherein:

the locking member (120) includes two cantilevers extending forward from both lateral sides of the locking member body (129) respectively away from the pivoting shaft (121), and an opened slot (125) is formed between the two cantilevers; and the first recessed portions (123) and the second recessed portions (124) are respectively formed on each of the cantilevers, wherein each of the first recessed portions (123) and the second recessed portions (124) is in an obtuse-angled concave configuration viewed along the lateral direction, such that an end of each of the cantilevers is in an acute-angled convex configuration, and the two cantilevers are left-right symmetrical in respect to a longitudinal centerline of the locking member (120).

6. The latch (100) according to claim 5, wherein:
the operating member (130) includes an operating member body (131) and abutting portions (132), the abutting portions (132) are located at a longitudinal rear end of the operating member body (131) and extend along the lateral direction from both lateral sides of the operating member body (131); and
when the operating member (130) is in the first position, the abutting portions (132) are fit into the first recessed portions (123), and when the operating member (130) is in the second position, the abutting portions (132) are fit into the second recessed portions (124), such that the operating member (130) is mounted on the locking member (120) via the abutting portions (132), and a longitudinal front end of the operating member (130) extends forward along the longitudinal direction.

7. The latch (100) according to claim 6, wherein:
the operating member body (131) is accommodated in the opened slot (125), such that portions of the operating member (130) other than the abutting portions (132) are not overlapped with the locking member (120) in the thickness direction.

8. The latch (100) according to claim 7, wherein:
a portion of the operating member (130) extending forward along the longitudinal direction forms a pull ring (133) for a user to perform a pulling operation;
the housing (110) is provided with a housing ring (114), and the housing ring (114) is located at a longitudinal front end of the accommodating space for the user to hold; and
the pull ring (133) is arranged in a space surrounded by the housing ring (114), when the operating member (130) is in its first position, the pull ring (133) is away from an inner side of the housing ring (114), and when the operating member (130) is in its second position, the pull ring (133) is close to the inner side of the housing ring (114).

9. The latch (100) according to claim 8, wherein:
a sliding slot (134) extending along the longitudinal direction is arranged at a lateral center position of the operating member body (131) of the operating member (130), and a positioning protrusion (113) inserted into one end of the sliding slot (134) is arranged on an inner side of the housing (110); and
the latch (100) further comprises a first elastic member (140) for biasing the operating member (130) to the first position, the first elastic member (140) is arranged in the sliding slot (134) of the operating member (130), and both ends of the first elastic member (140) respectively abut against the positioning protrusion (113) and the other end of sliding slot (134).

10. The latch (100) according to claim 9, wherein:
the housing (110) has a substantially flat rectangular shape, the first housing (111), the second housing (115), the locking member (120) and the operating member body (131) are all substantially in a shape of a plate, and a thickness of the entire latch (100) does not exceed a thickness of the locking member (120);
notches corresponding to the cantilevers of the locking member (120) are arranged on the first housing (111) to provide a pivoting space for the locking member (120);
the locking member body (129) of the locking member (120) is provided with engaging concave portions (126) on both lateral sides respectively, the engaging concave portions are disposed between the pivoting shaft (121) and the first recessed portions (123) along the longitudinal direction, and inner sides of the opening (116) of the second housing (115) are correspondingly provided with engaging convex portions (117) for cooperating with the engaging concave portions (126), so as to restrict a pivoting degree of the locking member (120) extending from the housing (110); and
the positioning protrusion (113) is formed on a longitudinal front side of the opening of the second housing (115).

11. The latch (100) according to claim 1, wherein:
a second elastic member (150) is disposed between the housing (110) and the locking member (120), and the second elastic member biases the locking member (120) to its locked position.

12. The latch (100) according to claim 6, wherein:
the abutting portions (132) are closer to the second housing (115) in the thickness direction than a rotation center of the pivoting shaft (121), and when the locking member (120) is in its locking position, the abutting portions (132) abut against a rear end of the first recessed portions (123) to prevent the locking member (120) from being pivoted toward its unlocked position.

13. The latch (100) according to claim 6, wherein:
the second recessed portions (124) are arranged such that when the locking member (120) is in its locked position, front surfaces of the second recessed portions (124) do not protrude beyond the housing (110).

14. A locking structure comprising:
the latch (100) according to claim 1, fixed on a side of the first object (200) facing the second object (300), and the second object (300) is provided with a corresponding locking hole for the locking portions (122) to extend into; and
wherein the first object (200) is capable of being inserted into the second object (300) along the longitudinal direction.

* * * * *